Aug. 11, 1942.    J. H. PROCTOR    2,292,545
REEL
Filed Aug. 26, 1940    2 Sheets-Sheet 1

INVENTOR.
John H. Proctor
BY Gardner W. Pearson
ATTORNEY

Aug. 11, 1942.    J. H. PROCTOR    2,292,545
REEL
Filed Aug. 26, 1940    2 Sheets-Sheet 2
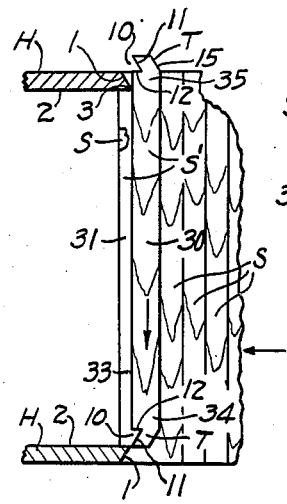
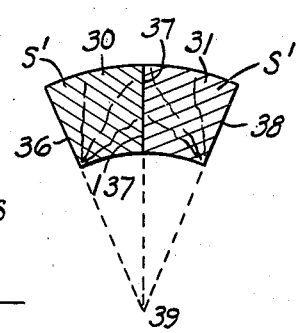
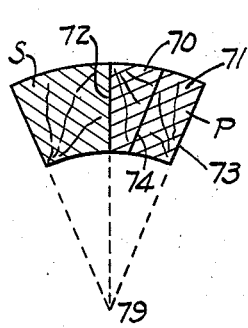
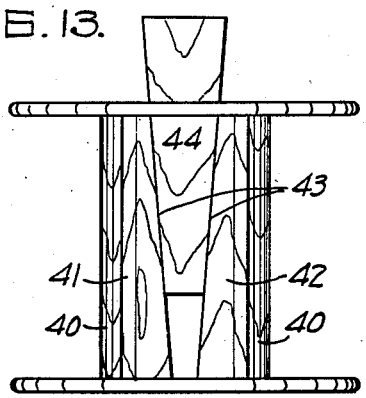
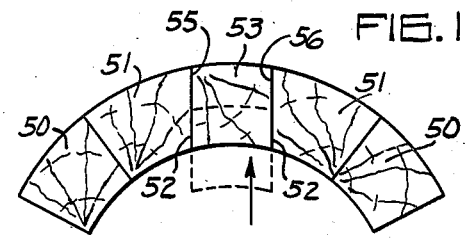
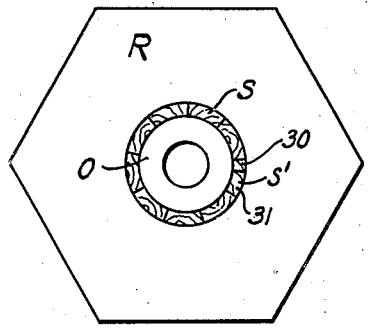
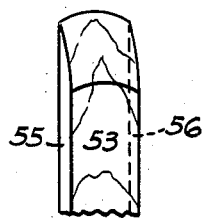
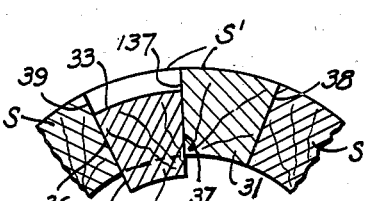
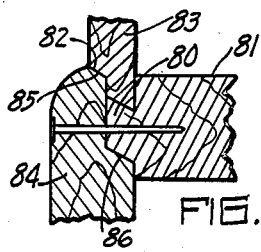
INVENTOR.
John H. Proctor
BY Gardner W. Barson
ATTORNEY Patented Aug. 11, 1942

2,292,545

UNITED STATES PATENT OFFICE 2,292,545

REEL

John H. Proctor, Brookline, N. H.

Application August 26, 1940, Serial No. 354,160

4 Claims. (Cl. 242—118)

This invention relates to reels or spools, particularly for use in winding wire but the construction may also be used on spools, warp beams and other similar articles used for winding anything.

The reel comprises two heads connected by a barrel, the ends of which extend through each head.

Each head comprises a plate or disc which may be of wood or other suitable material through which is a hole which tapers and becomes smaller from the outside to the inside so as to leave an annular V-shaped rib. Each barrel is made up of a plurality of staves each of the length of the spool and each, preferably convexly curved on the exterior and also preferably concavely curved on the interior, all or most of the staves having their edges sloping in toward the axis of the reel, each being of substantially keystone cross section.

Each stave has at each end a curved tenon which is formed by a curved V-shaped slot on the exterior and by a curved cut on the interior. When the staves are assembled, their tenons around their exterior at each end define a V-shaped annular recess and on their interior, they define an annular recess which tapers and curves from the outside inward so that when the heads are assembled on the barrel, a locking disk, each of which tapers from the outside inward, will fit inside the tenons at each end of the staves.

Preferably when assembled, there is left and defined at the interior and at the exterior annular shoulders lying in a plane or planes perpendicular to the axis.

The various parts can be glued in place or each locking disk can be attached to the barrel by nails driven in diagonally or in any other suitable way. The main feature of the device is the staves with outwardly spreading, curved tenons which pass through the heads and are locked in place by locking disks.

In the preferred form of my reel the heads and locking disks are made of several layers of wood with the grains crossed, but they might be made of any material. Preferably the rim of each locking disk is a circle concentric with the outer rim of a head so that both can be cut from the same piece at the same time thus saving labor and expense, and preferably the ends of the tenons of the staves when in place coincide with the outside faces of the heads and of the locking disks but they may be longer or shorter if desired.

In the drawings:

Fig. 10 is a sectional view on a vertical plane showing part of a special stave as it is being driven into place.

Fig. 11 is a horizontal sectional view of one type of special stave and Fig. 12 is a similar view of a somewhat different type.

Fig. 13 is an elevation similar to Fig. 5 of a modified construction.

Fig. 14 is a diagrammatic end elevation of an assembly of staves of a somewhat modified type.

Fig. 15 is a plan view similar to Fig. 1 showing a different shaped head and Fig. 16 is an isometric view of the special stave shown in Fig. 14.

Fig. 17 is an enlarged sectional view looking down on the line 17—17 of Fig. 5.

Fig. 18 is a view similar to Figs. 7 and 9 showing a modification of the locking means.

Figure 1:
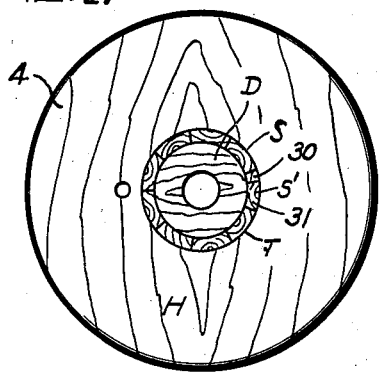
Fig. 1 is a plan view and Fig. 2 is an elevation with parts broken away of a reel of my construction.
Figure 2:
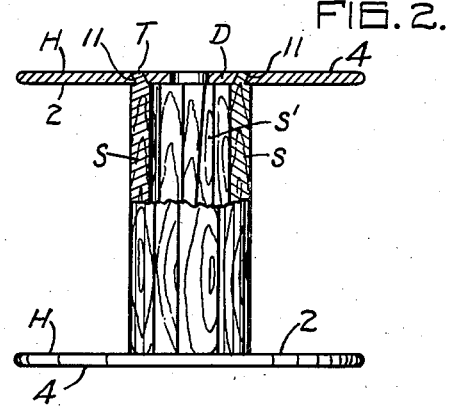
Figure 3:
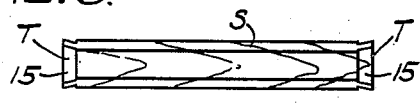
Fig. 3 is a view from the inside of a regular stave and Fig. 4 of a split stave.
Figure 4:
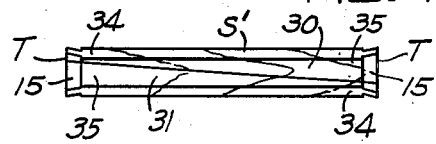
Figure 5:
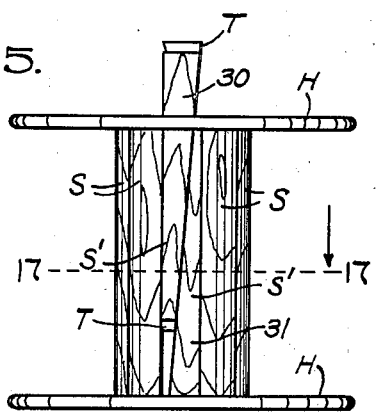
Fig. 5 is an elevation of a partly assembled reel and Fig. 6 is a view from the inside or smaller side of a locking disk.
Figure 6:
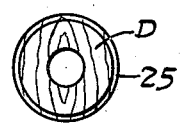
Figure 7:
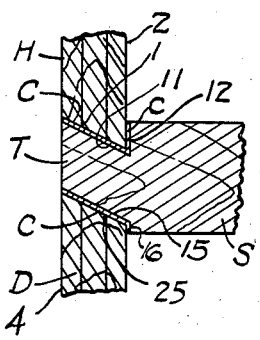
Figs. 7 and 9 are sectional details of the joint between the head disk and staves showing different devices and Fig. 8 is a plan or end view of a regular stave.
Figure 8:
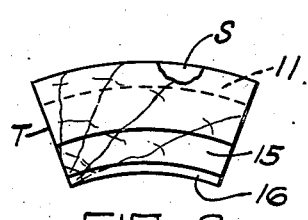

In the drawings H, H, represent the plate or disk shaped heads each of which has a tapered barrel hole 1, an outside face 4 and an inside face 2. S. S¹, represent the staves each of which has at each end a tenon T. Each tenon T is formed on its exterior with the curved V-shaped recess 10 with one side 12 preferably perpendicular to the length of the stave and the other side 11 convex and sloping outward. The interior of each tenon is defined by a curved concave cut 15 with an outward slope which conforms to a part of the truncated cone which is the shape of the tapered curved rim 25 of a truncated conical locking disk D. Preferably a shoulder 16 is left at the inner side of each tenon.

One of the staves S¹ is diagonally cut to form two wedge shaped parts 30 and 31. In assembling, all of the whole staves, S, S, are readily placed in position in and between the heads H, H, and one of these parts 31 is also readily placed in position. As shown in Fig. 17, the small end 34 of 30 is now inserted between the side face 137 of 31 and the side face 39 of the adjoining stave S. The outside convex face 33 at the large end 35 of 30 can rest against the inner edge 3 of a barrel hole 1 while at the small end 34, it is guided so that the tenon at the small end will pass inside the barrel hole 1 in the other head.

Pressure is now applied in the direction of the vertical arrow in Fig. 10 and on account of the diverging of the faces 36 and 37, they tend to exert pressure in the direction of the horizontal arrow. The result is that the recess 10 which forms the tenons slips over the inner edge 3 of the barrel hole 1 thus locking all parts in place and with the part 12 of the recess 19 resting firmly against the inside face 2 of each head.

The heads and staves will hold together without the locking disks D but I prefer to use such disks.

Figure 9:
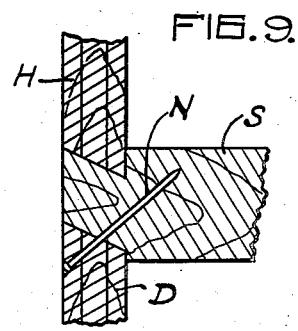

Preferably, the staves S and S¹ are made of wood and have enough resiliency to permit the wedge shaped section of the split stave to be so moved that the tenons slip into place. After the heads and staves are assembled, I prefer to place a locking disk D inside of the tenons at each end and to hold it in place and to hold the other parts in place by a suitable glue or adhesive indicated by C or by nails N, N, as shown in Fig. 9 or by using both adhesive and nails or some other suitable fastening means.

As shown in Fig. 13, the barrel may be made up of three kinds of staves, 40, 41, and 42. Each stave 40 is of the same shape as the stave S, while the staves 41 and 42 are so formed that their adjoining edges form a wedge shaped recess 43 for a wedge shaped stave 44.

As shown in Fig. 14, instead of driving a special wedge shaped stave in parallel with the axis, the majority of the staves such as 50 can be keystone shape in cross section while two adjoining staves 51, 51 may be so made and placed that their nearest faces, 52, 52, are parallel. In this construction, another special stave 53 with parallel walls 55, 56 and suitable tenons at each end can be pushed from the inside outward as shown by the arrow until the tenons take their proper position. This stave 53 is shown in Fig. 16.

The longitudinal side walls of the stave or part of a stave which is to go in last can converge to a centre line 39 as 36, 37, 38 shown in Fig. 11, or the outer sides 72 and 73 of a special stave P formed of lengthwise wedge shaped parts 70 and 71 can converge on a line 79 while the sides 74 and 73 of the part 71 to be driven in can be in planes which converge lengthwise but are at equal distances apart on planes which extend from the interior to the exterior. With this construction, the last stave or section can be forced into place from the inside outward and also can be driven lengthwise if necessary.

After the locking disks are in place and the parts are nailed or cemented together, none of these assemblies can separate. The outside shoulder 12 and the inside shoulder 16 of each stave keeps the parts from slipping.

Ordinarily each head would be of circular shape but as shown in Fig. 15 each head R may be of hexagonal, octagonal or polygonal shape if desired, but each locking disk O should be circular.

As shown in Fig. 18, the tenons 80 of staves 81 can go only part way through a hole 82 in a head 83, the locking disk 84 having an outer rim of two sizes 85 and 86. As shown, disk 84 is thicker than head 83.

I claim:

1. The combination in a reel; of two disk shaped heads having interior oppositely disposed parallel faces in a plane at right angles with their axis and each having a barrel hole which tapers and becomes smaller from the outside to the inside; with a barrel made up of a plurality of staves each having at each end a tenon extending outwardly from a shoulder which engages the inside face of a head, the outer face of each tenon being convex and the inner face being concave, one stave being diagonally split lengthwise; a truncated conical locking disk at each end inside the tenons at that end; and means to fasten each locking disk to the tenons.

2. The combination in a reel; of two disk shaped heads each having a barrel hole which tapers and becomes smaller from the outside to the inside; with a barrel made up of a plurality of staves each having at each end a tenon extending outwardly from a shoulder which engages the inside face of a head, the outer face of each tenon being convex and the inner face being concave, one stave being diagonally split lengthwise; a truncated conical locking disk at each end inside the tenons at that end; and means to fasten each locking disk to the tenons.

3. The combination in a reel; of two disk shaped heads each having a barrel hole which tapers from the outside to the inside; with a barrel made up of a plurality of staves each having at each end a tenon extending outwardly from a shoulder which engages the inside face of a head, one stave being diagonally split lengthwise; a locking disk at each end inside the tenons at that end; and means to fasten each locking disk to the tenons.

4. The combination in a reel; of two heads each having a barrel hole which tapers from the outside to the inside; with a barrel made up of a plurality of staves so assembled as to form an unbroken tube, each stave having at each end a tenon extending outwardly from a shoulder which engages the inside face of a head, the outside face of each tenon fitting part of the inside face of the tapered hole in a head; a locking disk at each end inside the tenons at that end; and means to fasten each locking disk to the adjoining tenons.

JOHN H. PROCTOR.